US011260965B2

(12) United States Patent
Cazin et al.

(10) Patent No.: US 11,260,965 B2
(45) Date of Patent: Mar. 1, 2022

(54) AIRCRAFT LANDING GEAR FORWARD TRUNNION SUPPORT ASSEMBLIES AND RELATED METHODS

(71) Applicant: The Boeing Company, Chicago, IL (US)

(72) Inventors: Ryan J. Cazin, Mukilteo, WA (US); Benjamin J. Palmer, Seattle, WA (US); Pejhman Rezai, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 457 days.

(21) Appl. No.: 16/384,473

(22) Filed: Apr. 15, 2019

(65) Prior Publication Data
US 2020/0324882 A1    Oct. 15, 2020

(51) Int. Cl.
*B64C 25/04* (2006.01)
*B64C 3/18* (2006.01)
*B64C 25/12* (2006.01)

(52) U.S. Cl.
CPC ........... *B64C 25/04* (2013.01); *B64C 3/185* (2013.01); *B64C 25/12* (2013.01)

(58) Field of Classification Search
CPC ......... B64C 3/185; B64C 25/04; B64C 25/12; B64C 25/18; B64C 25/20; B64C 2025/125
See application file for complete search history.

(56) References Cited

U.S. PATENT DOCUMENTS

| 2,750,134 | A | * | 6/1956 | Hawkins, Jr. | ........... B64C 25/34 244/102 R |
| 3,687,400 | A | * | 8/1972 | Fitzgerald | ............... B64C 25/34 244/102 R |

(Continued)

FOREIGN PATENT DOCUMENTS

| EP | 2562083 A2 | 2/2013 |
| EP | 3418188 A1 | 12/2018 |

(Continued)

OTHER PUBLICATIONS

European Patent Office, "Extended European Search Report," issued in connection with European Patent Application No. 20168250.7, dated Sep. 14, 2020, 7 pages.

*Primary Examiner* — Richard R. Green
*Assistant Examiner* — Arfan Y. Sinaki
(74) *Attorney, Agent, or Firm* — Hanley, Flight & Zimmerman, LLC

(57) ABSTRACT

Aircraft landing gear forward trunnion support assemblies and related methods are described herein. An example aircraft wing disclosed herein includes a rear spar having a rear side and a front side opposite the rear side and a forward trunnion support assembly. The forward trunnion support assembly includes first and second vertical support fittings coupled to the rear side of the rear spar, and a trunnion housing with a bearing. The trunnion housing is coupled between the first and second vertical support fittings. A central axis of the bearing is perpendicular to the rear side of the rear spar. The forward trunnion support assembly also includes a side load fitting disposed on the rear side of the rear spar. A first end of the side load fitting is coupled to the second vertical support fitting, and a second end of the side load fitting is coupled to the rear spar.

20 Claims, 10 Drawing Sheets

(56) References Cited

U.S. PATENT DOCUMENTS

| | | | | |
|---|---|---|---|---|
| 3,917,193 A * | 11/1975 | Runnels, Jr. | ............ | B64C 21/04 244/207 |
| 4,392,623 A * | 7/1983 | Munsen | ................ | B64C 25/10 244/102 R |
| 10,654,562 B2 * | 5/2020 | Wilson | ................... | B64C 25/10 |
| 2004/0245375 A1 * | 12/2004 | Adamson | ............... | B64D 27/18 244/15 |
| 2006/0237584 A1 * | 10/2006 | Hinton | ................... | B64C 25/10 244/102 R |
| 2012/0073137 A1 * | 3/2012 | Bestwick | ................ | B64C 3/187 29/897.2 |
| 2013/0048783 A1 * | 2/2013 | Ekmedzic | ............... | B64C 25/04 244/102 R |
| 2016/0009365 A1 * | 1/2016 | Marks | ....................... | B64C 3/18 244/123.1 |
| 2018/0362150 A1 * | 12/2018 | Sakota | ................... | B64C 25/12 |
| 2019/0135416 A1 * | 5/2019 | Woolcock | ............... | B64C 25/20 |
| 2019/0233129 A1 * | 8/2019 | Lafont | .................... | B64C 3/187 |

FOREIGN PATENT DOCUMENTS

| | | | | |
|---|---|---|---|---|
| GB | 2320002 A * | 6/1998 | ............ | B64C 25/12 |
| GB | 2551380 A | 12/2017 | | |

\* cited by examiner

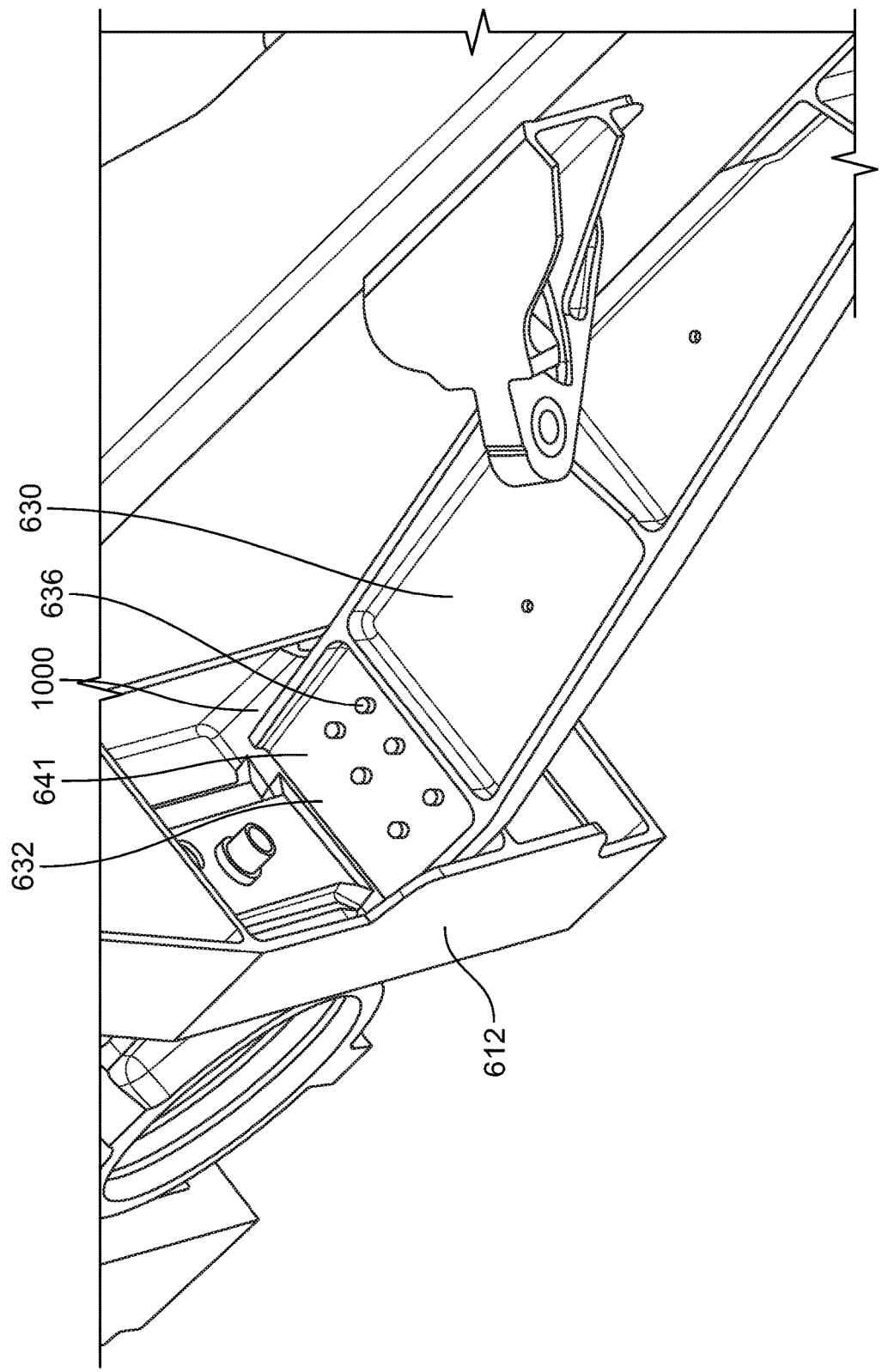

AIRCRAFT LANDING GEAR FORWARD TRUNNION SUPPORT ASSEMBLIES AND RELATED METHODS

FIELD OF THE DISCLOSURE

This disclosure relates generally to aircraft and, more particularly, to aircraft landing gear forward trunnion support assemblies and related methods.

BACKGROUND

Aircraft (e.g., commercial aircraft) commonly include landing gear (e.g., left main landing gear, right main landing gear, etc.) that may be actuated to move between a deployed position and a retracted position. For example, the landing gear of an aircraft may by actuated to move from the deployed position to the retracted position subsequent to and/or in connection with a takeoff procedure of the aircraft, and from the retracted position back to the deployed position prior to and/or in connection with a landing procedure of the aircraft. The landing gear is connected to various support structures in the fuselage and/or wings of the aircraft. The landing gear and these support structures are subjected to extremely high loads, especially when landing and braking, for instance.

SUMMARY

An example aircraft wing disclosed herein includes a rear spar having a rear side and a front side opposite the rear side and a forward trunnion support assembly. The forward trunnion support assembly includes a first vertical support fitting and a second vertical support fitting coupled to the rear side of the rear spar, and a trunnion housing with a bearing. The trunnion housing is coupled between the first and second vertical support fittings. A central axis of the bearing is perpendicular to the rear side of the rear spar. The forward trunnion support assembly also includes a side load fitting disposed on the rear side of the rear spar. A first end of the side load fitting is coupled to the second vertical support fitting, and a second end of the side load fitting is coupled to the rear spar.

An example method disclosed herein includes coupling a trunnion housing between a first vertical support fitting and a second vertical support fitting. The trunnion housing includes a bearing. The example method includes coupling the first and second vertical support fittings to a rear side of a rear spar of a wing of an aircraft. A central axis of the bearing is parallel to the rear spar. The example method further includes coupling a first end of a side load fitting to the second vertical support fitting and coupling a second end of the side load fitting to the rear spar.

An example aircraft wing disclosed herein includes a rear spar having a rear side and a front side opposite the rear side and a forward trunnion support assembly. The forward trunnion support assembly includes a side load backup fitting disposed on the front side of the rear spar, a forward trunnion housing assembly coupled to the rear side of the rear spar, and a side load fitting disposed on the rear side of the rear spar. A first end of the side load fitting is coupled to the forward trunnion housing assembly, and a second end of the side load fitting is coupled to the side load backup fitting via a first plurality of fasteners extending through the rear spar. The example aircraft wing also includes an upper stabilization brace fitting disposed on the rear side of the rear spar. The upper stabilization brace fitting is coupled to the side load backup fitting via a second plurality of fasteners extending through the rear spar.

BRIEF DESCRIPTION OF THE DRAWINGS

FIG. 6 is a perspective view showing the example forward trunnion support assembly and upper stabilization brace fitting on the rear spar of the wing of the aircraft of FIG. 1.

FIG. 10 is an enlarged view of a joint formed between an example side load fitting and an example vertical support fitting of the example forward trunnion support assembly of FIG. 6.

Figure 1:
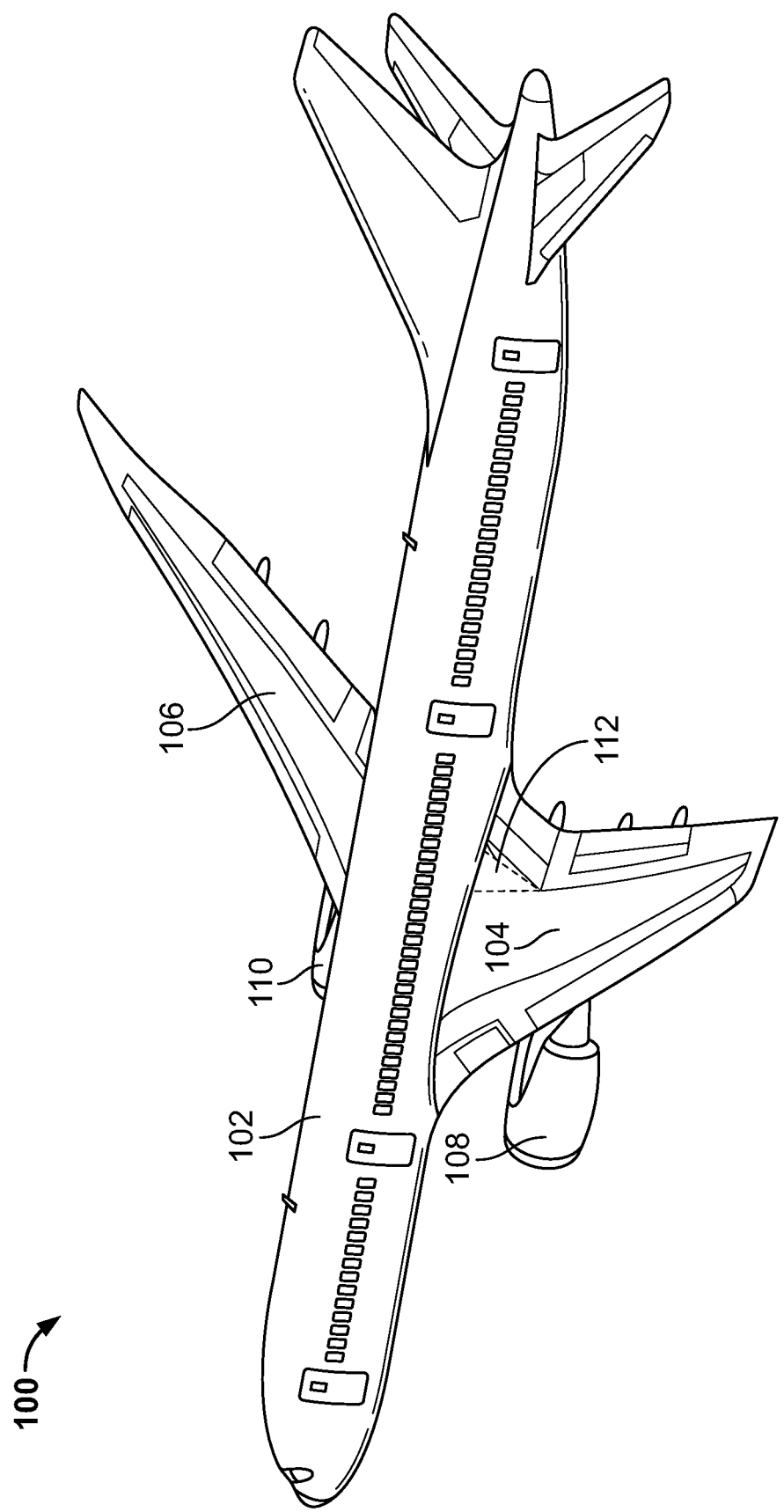
FIG. 1 illustrates an example aircraft in which the examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located there-between. Stating that any part is in contact with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first"

may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Disclosed herein are example forward trunnion support assemblies for aircraft main landing gear. Example forward trunnion support assemblies disclosed herein include a side load backup fitting that is used as a backup fitting for a side load fitting and an upper stabilization brace fitting. As such, the example forward trunnion support assemblies disclosed herein utilize less backup fittings than known assemblies, which reduces overall weight to the aircraft and, thus, improves fuel efficiency.

Example forward trunnion support assemblies disclosed herein include a trunnion housing that is parallel to the rear spar instead of angled relative to the rear spar as in known assemblies. By positioning the trunnion housing parallel to the rear spar, the example side load fitting can be disposed inboard of the trunnion housing while still providing an effective load path between the trunnion housing and the rear spar. This enables the side load backup fitting to be positioned inboard relative to the trunnion housing so that the side load backup fitting can also support the upper stabilization brace fitting. Further, by having the trunnion housing parallel to the rear spar, the example forward trunnion support assemblies are easier to install on a rear spar compared to known trunnion housings that are angled relative to the rear spar and which require hidden fasteners that are difficult to access.

Also disclosed herein are related methods of assembling and/or installing forward trunnion support assemblies and upper stabilization brace fittings. The example forward trunnion support assemblies and upper stabilization brace fittings disclosed herein are easier and quicker to install than known assemblies, which reduces overall assembly time and cost.

Now turning to the figures, FIG. 1 illustrates an example aircraft 100 in which the examples disclosed herein can be implemented. The aircraft 100 includes a fuselage 102, a first wing 104 (a left wing) coupled to and extending outward from the fuselage 102, and a second wing 106 (a right wing) coupled to and extending outward from the fuselage 102. In the illustrated example, the aircraft 100 includes a first engine 108 carried by the first wing 104 and a second engine 110 carried by the second wing 106. In other examples, the aircraft 100 may include only one engine or may include more than two engines, and the engines may be coupled to the first and/or second wings 104, 106 and/or another structure on the aircraft 100 (e.g., on the tail section of the fuselage 102).

The aircraft 100 includes landing gear that is used for taxiing, takeoff, and landing. The landing gear of the aircraft 100 may have many different arrangements. Typical aircraft employ a tricycle undercarriage arrangement including a left main landing gear (LMLG), a right main landing gear (RMLG), and a front wheel near the nose of the fuselage 102. The LMLG is coupled to the bottom of the first wing 104 at or near the root of the first wing 104 where the first wing 104 is coupled to the fuselage 102. Similarly, the RMLG is coupled to the bottom of the second wing 106 at or near the root of the second wing 106 where the second wing 106 is coupled to the fuselage 102. The front wheel is coupled to the bottom of the fuselage 102 near the nose. The LMLG, RMLG and front wheel are movable between a deployed state and a retracted state.

The LMLG is coupled the first wing 104 and the fuselage 102 via one or more structures (e.g., spars, beams, etc.) forming a gear triangle 112. An example location of the gear triangle 112 is illustrated in FIG. 1. In some examples, the gear triangle 112 is formed by a rear spar, a gear beam, and a side of the fuselage, as disclosed in further detail herein. The RMLG is similarly coupled to the second wing 106 and the fuselage 102 via another gear triangle. The examples disclosed herein are described in connection with the LMLG. However, it is understood that any of the examples disclosed herein in connection with the LMLG can likewise apply to the RMLG.

Figure 2:
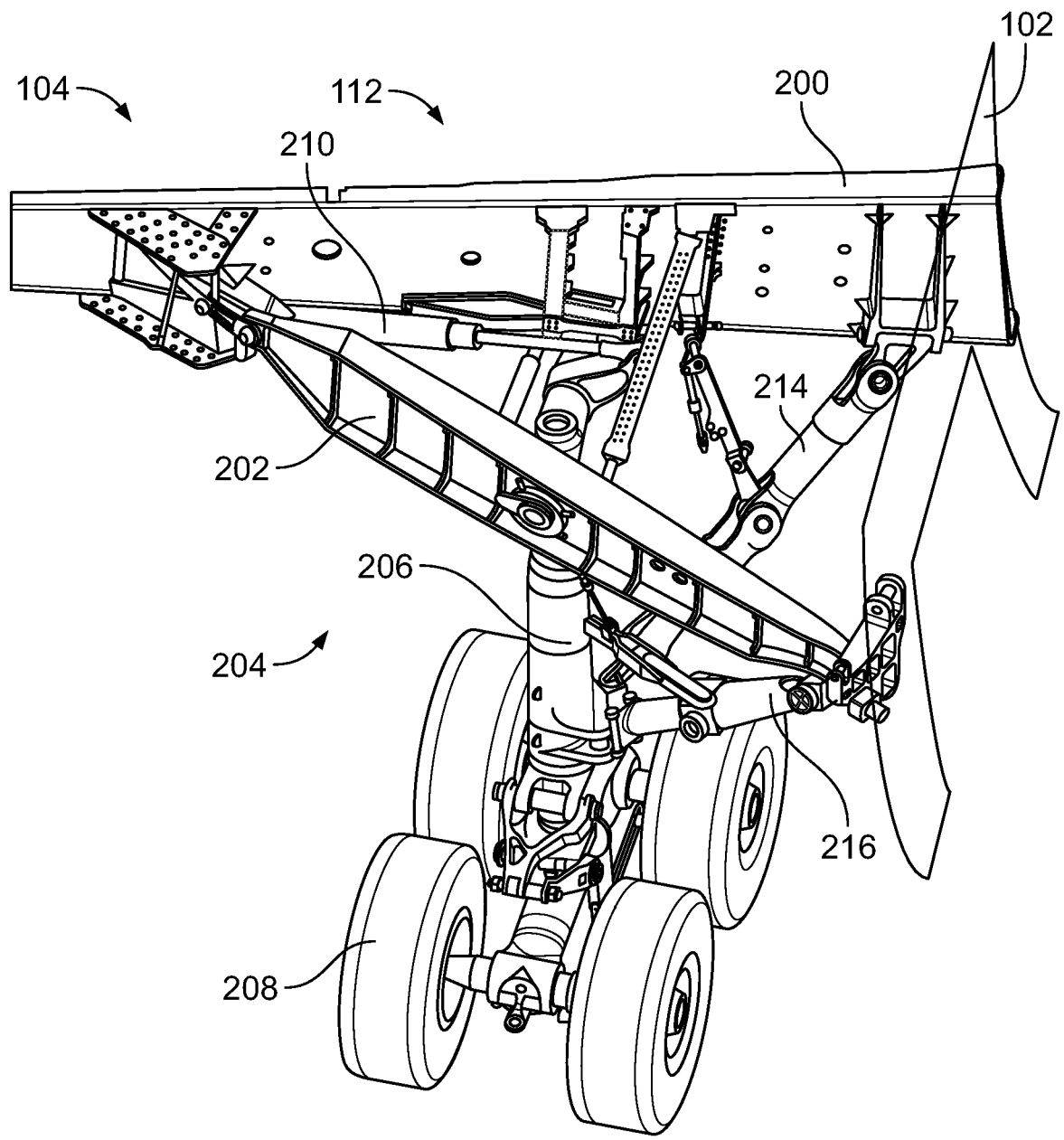
FIG. 2 illustrates a left main landing gear employed on an example wing of the aircraft of FIG. 1.

FIG. 2 shows the gear triangle 112 of the first wing 104. In FIG. 2, the top and bottom skin (e.g., panels) and the control surfaces of the first wing 104 have been removed to expose the internal structures of the first wing 104 that form the gear triangle 112. The first wing 104 includes a rear spar 200. The rear spar 200 is one of the primary load bearing members in the first wing 104. The rear spar 200 extends outward from the fuselage 102 to a tip of the first wing 104. In this example, the rear spar 200 has a C- or U-shaped cross-section or profile. In some examples, the rear spar 200 is constructed of a composite material, such as carbon fiber. The first wing 104 also has a front spar that extends outward from fuselage 102 and extends along the front (fore) side of the first wing 104. A plurality of ribs are coupled between the rear spar 200 and the front spar. In the illustrated example, the first wing 104 also includes a gear beam 202. The gear beam 202 is coupled between the rear spar 200 and the fuselage 102.

As can be seen from FIG. 2, the gear triangle 112 is formed by three main structures including (1) the gear beam 202, (2) the portion of the rear spar 200 between the fuselage 102 and the gear beam 202, and (3) the portion of the fuselage 102 between the rear spar 200 and the gear beam 202. Also shown in FIG. 2 is an example LMLG 204 (sometimes referred to as a landing gear assembly). The LMLG 204 is coupled to the gear triangle 112. The LMLG 204 is movable between a deployed state (as shown in FIG. 2) and a retracted or stowed state. The LMLG 204 includes a shock strut 206 (sometimes referred to as a post, an outer cylinder, and/or an oleo) and one or more wheels 208 coupled to the shock strut 206. In the illustrated example, the LMLG 204 includes four wheels 208 (one of which is referenced in FIG. 2). However, in other examples, the LMLG 204 can include more or fewer wheels (e.g., one wheel, two wheels, three wheels, five wheels, etc.). The LMLG 204 includes an actuator 210 to rotate the shock strut 206 between the deployed and retracted positions.

The LMLG 204 of FIG. 2 also includes a drag brace 214 (a first brace) and a side brace 216 (a second brace) that are used to transfer horizontal loads away from the shock strut 206. The drag brace 214 is coupled between the shock strut 206 and the rear spar 200 (near the fuselage 102). The side brace 216 is coupled between the shock strut 206 and the gear beam 202 (near the fuselage 102). The drag brace 214 and the side brace 216 can each include two or more links (struts) that enable the drag brace 214 and the side brace 216, respectively, to fold when the LMLG 204 is retracted.

Figure 3:
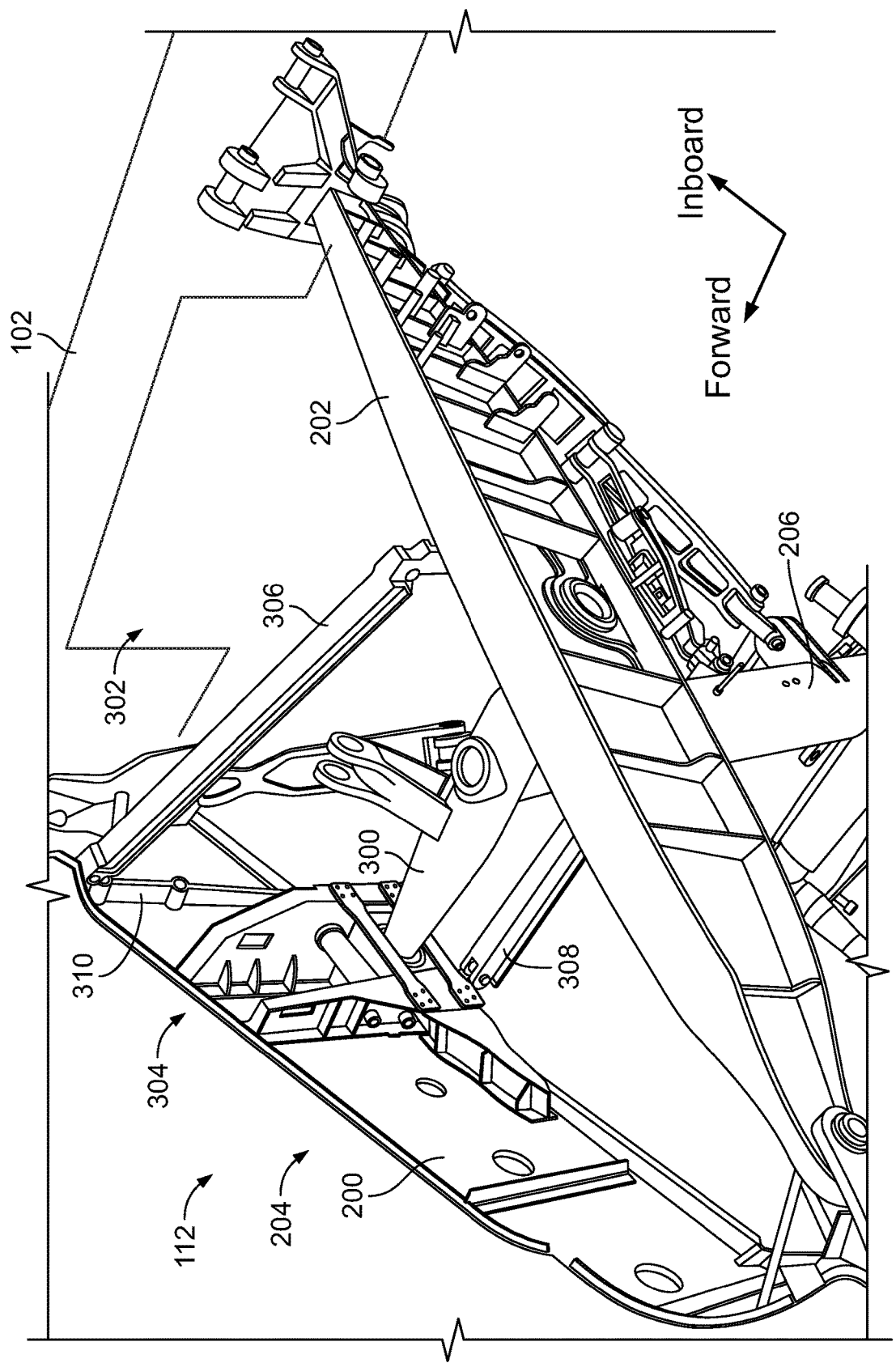
FIG. 3 shows a known forward trunnion support assembly used in connection with the left main landing gear of FIG. 2.

FIG. 3 is another perspective view of the LMLG 204 in the deployed state. In FIG. 3, the actuator 210 (FIG. 2) has been removed for clarity. The shock strut 206 is pivotably coupled to the rear spar 200 and the gear beam 202 via a trunnion 300. In the deployed state, as shown in FIG. 3, the shock strut 206 is oriented substantially vertically such that the wheels 208 (FIG. 2) are located beneath the aircraft 100 (FIG. 1). To retract the LMLG 204 (e.g., after take-off), the shock strut 206 is rotated (via the trunnion 300) upward toward the fuselage 102, which moves the wheels 208 into a well 302 formed in the bottom of the fuselage 102. To deploy the LMLG 204 (e.g., prior to landing), the shock strut 206 is rotated (via the trunnion 300) downward to the vertical orientation shown in FIG. 3.

The trunnion 300 extends between the rear spar 200 and the gear beam 202. In FIG. 3, the trunnion 300 is rotatably coupled to the rear spar 200 via a forward trunnion support assembly 304 on the rear spar 200. The forward trunnion support assembly 304 shown in FIG. 3 is a known forward trunnion support assembly. The opposite end of the trunnion 300 is similarly rotatably coupled to the gear beam 202 via a rear trunnion support assembly on the gear beam 202. The forward trunnion support assembly 304 and the rear trunnion support assembly enable the trunnion 300 (and, thus, the shock strut 206) to pivot/rotate about an axis.

Due to industry safety requirements, the LMLG 204 is required to be able to be severed from the gear triangle 112 without rupturing the fuel tank (which is stored inside of the first wing 104) and without removing the gear beam 202 from the first wing 104. As such, many constraints dictate the design and function of the forward trunnion support assembly 304. Parts of the forward trunnion support assembly 304 are configured to break when a sufficient vertical or side load is exerted, which enables the shock strut 206 (as well as other parts of the LMLG 204) to sever from the gear triangle 112.

To provide support and rigidity to the gear beam 202, the first wing 104 includes an upper stabilization brace 306 and a lower stabilization brace 308. The upper and lower stabilization braces 306, 308 are coupled to and extend between the rear spar 200 and the gear beam 202. The upper stabilization brace 306 is located at or near a top of the rear spar 200, whereas the lower stabilization brace 308 is located at or near a bottom of the rear spar 200. As shown in FIG. 3, the upper stabilization brace 306 is located inboard relative to the trunnion 300, and the lower stabilization brace 308 is located outboard relative to the trunnion 300. One end of the upper stabilization brace 306 is coupled to an upper stabilization brace fitting 310 disposed on the rear spar 200. The opposite end of the upper stabilization brace 306 is coupled to another fitting on the gear beam 202. The ends of the lower stabilization brace 308 are similarly coupled to fittings on the rear spar 200 and the gear beam 202.

Figure 4:
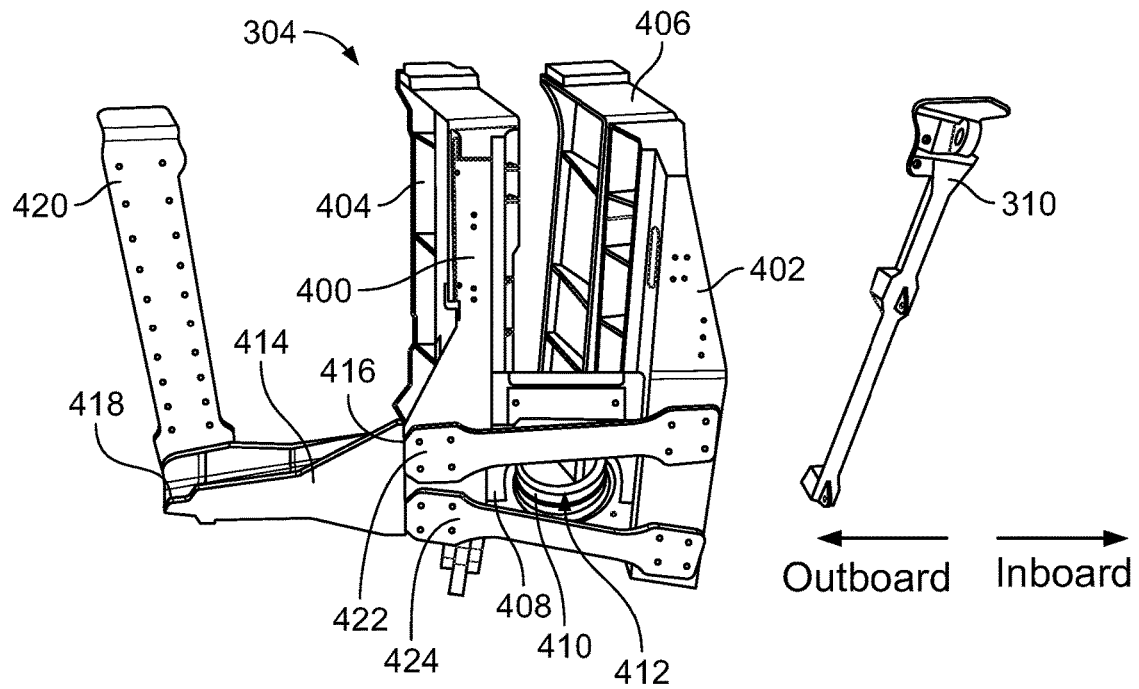
FIG. 4 is an isolated perspective view of the known forward trunnion support assembly of FIG. 3 and a known upper stabilization brace fitting.
Figure 5:
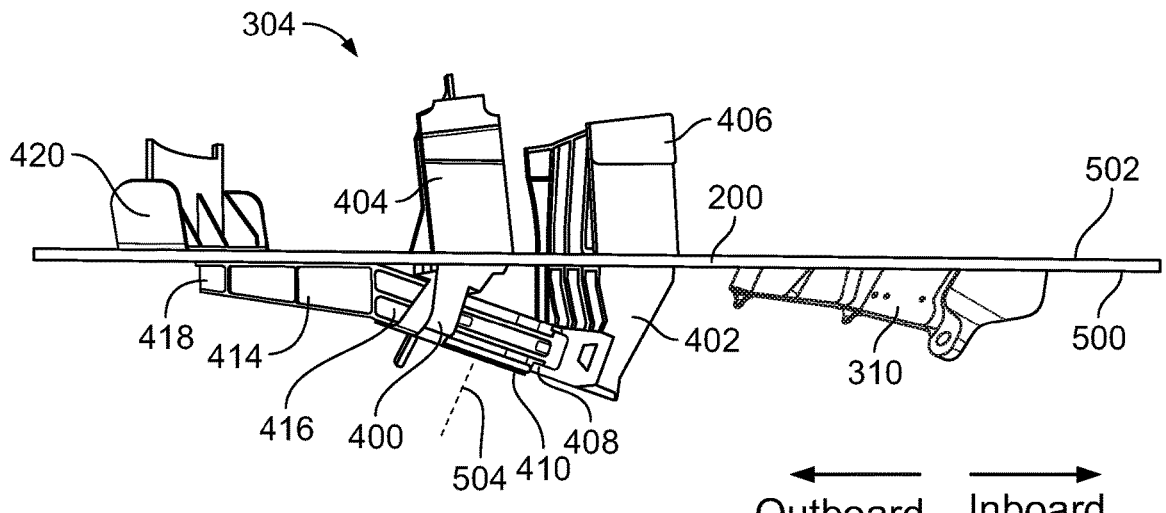
FIG. 5 shows the known forward trunnion support assembly and upper stabilization brace fitting of FIG. 4 on a rear spar.

FIG. 4 is a perspective view of the known forward trunnion support assembly 304 and the upper stabilization brace fitting 310. The rear spar 200 is not shown in FIG. 4. FIG. 5 is a top cross-sectional view of the rear spar 200 looking downward on the known forward trunnion support assembly 304 and the upper stabilization brace fitting 310. The rear spar 200 has a rear side 500 (an aft side, an outer side, an outside face) and a front side 502 (a forward side, an inner side, an inside face) opposite the rear side 500. As shown in FIGS. 4 and 5, the known forward trunnion support assembly 304 includes a first vertical support fitting 400 and a second vertical support fitting 402. The first and second vertical support fittings 400, 402 are disposed on and coupled to the rear side 500 of the rear spar 200. The first and second vertical support fittings 400, 402 are coupled (via fasteners) to respective first and second vertical backup fittings 404, 406 that are disposed on the front side 502 of the rear spar 200. The known forward trunnion support assembly 304 includes a trunnion housing 408 with a bearing 410. The trunnion housing 408 is coupled between the first and second vertical support fittings 400, 402. The bearing 410 forms an opening 412 that receives the trunnion 300 (FIG. 3).

As shown in FIG. 5, the trunnion housing 408 (and, thus, the bearing 410) are angled with respect to the rear spar 200. In particular, a central axis 504 of the trunnion housing 408 and the bearing 410 is not perpendicular to the rear side 500 of rear spar 200. Thus, a normal of the rear spar 200 (a line extending perpendicular to the rear spar 200) and a normal of the trunnion housing 408 (a line extending perpendicular to the trunnion housing 408) are not parallel. Instead, the trunnion housing 408 and the bearing 410 are angled in the outboard direction.

The trunnion housing 408 and the bearing 410 may experience significant side-to-side loads (horizontal loads) from the trunnion 300 (FIG. 3). For instance, if a pilot desires to steer the aircraft 100 (FIG. 1) to the left while the aircraft 100 is on the ground, the pilot may lock the LMLG 204 (e.g., apply a brake to the wheels 208) and increase thrust to the right engine(s). This causes the aircraft 100 to pivot about the LMLG 204, thereby steering the aircraft 100 to the left. This pivoting action also induces side-to-side (horizontal) loads in the trunnion 300 and the trunnion housing 408.

To help distribute some of these side-to-side loads, the known forward trunnion support assembly 304 includes a side load fitting 414 coupled between the first vertical support fitting 400 and the rear spar 200. Because the trunnion housing 408 is angled toward the outboard direction, the side load fitting 414 is located outboard of the trunnion housing 408, which creates a more direct load path from the trunnion housing 408 to the rear spar 200. A first end 416 of the side load fitting 414 is coupled to the first vertical support fitting 400 and a second end 418 of the side load fitting 414 is coupled to the rear spar 200, outboard of the first vertical support fitting 400. The known forward trunnion support assembly 304 includes a side load backup fitting 420 that is disposed on the front side 502 of the rear spar 200. The second end 418 of the side load fitting 414 is coupled (via fasteners), through the rear spar 200, to the side load backup fitting 420. The side load backup fitting 420 is a vertical member that extends vertically on the front side 502 of the rear spar 200. The side load backup fitting 420 distributes the loads provided by the side load fitting 414 along the height of the rear spar 200. The known forward trunnion support assembly 304 also includes first and second straps 422, 424 coupled between the first and second vertical support fittings 400, 402. If the trunnion 300 (FIG. 3) is pushed in the outboard direction, for instance, the side load fitting 414 is placed in compression and transfers the loads to the side load backup fitting 420 and, thus, to the rear spar 200. If the trunnion 300 is pushed in the inboard direction, for instance, the first and second straps 422, 424 transfer the load from the second vertical support fitting 402 to the first vertical support fitting 400, which places the side load fitting 414 in tension. This tensile load is transferred to the side load backup fitting 420, which distributes the load along the rear spar 200.

Also shown in FIGS. 4 and 5 is the known upper stabilization brace fitting 310. The known upper stabilization brace fitting 310 is disposed on the rear side 500 of the rear spar 200. The known upper stabilization brace fitting 310 is a full-height fitting that extends vertically on the rear side 500 of the rear spar 200. The upper stabilization brace 306 (FIG. 3) is to be attached to the upper stabilization brace fitting 310. The upper stabilization brace fitting 310 distributes any loads imparted on the upper stabilization brace fitting 310 by the upper stabilization brace 306 throughout the height of the rear spar 200. The upper stabilization brace fitting 310 is disposed inboard of the first and second vertical support fittings 400, 402 and the trunnion housing 408.

While the known forward trunnion support assembly 304 of FIGS. 3-5 is effective, this known assembly requires the use of multiple large structural components and fasteners. These components and fasteners add weight to aircraft 100, which reduces fuel efficiency. Also, because the side load fitting 414 is located near the bottom of the rear spar 200, the fasteners that connect the side load fitting 414 to the side load backup fitting 420 are subjected to higher stresses. More specifically, as the rear spar 200 bends upward or downward (e.g., during flight when the first wing 104 bends), the lower part of the rear spar 200 is placed in compression or tension. Therefore, any fasteners located near the bottom of the rear spar 200 are exposed to these stresses. As such, larger, more robust fasteners are used to tolerate not only these loads from the rear spar 200, but also the loads from the trunnion 300 (FIG. 3). These larger, heavier fasteners are more costly and add weight to the aircraft 100.

Further, this known forward trunnion support assembly 304 is also difficult to install. The first and second vertical support fittings 400, 402 extend from the rear spar 200 in an angled direction (outboard). The fasteners that extend through the outboard sides of the first and second vertical support fittings 400, 402 and into the rear spar 200 are difficult to install because of the angle. This increases installation time and costs, which increases the overall cost of manufacture of the aircraft 100. Further, all of the components have pre-drilled fastener openings, including the rear spar 200. Therefore, the allowable tolerances must be extremely small in order to ensure the fastener openings will align. Providing components with this level of tolerance increases production costs. Also, all of the parts on the rear side 500 of the spar 200 (the first and second vertical support fittings 400, 402, the side load fitting 414, etc.) are assembled first, and then connected the rear spar 200 as a unit. The assembled unit is relatively heavy and difficult to maneuver as well as connect to the rear spar 200.

Figure 6:
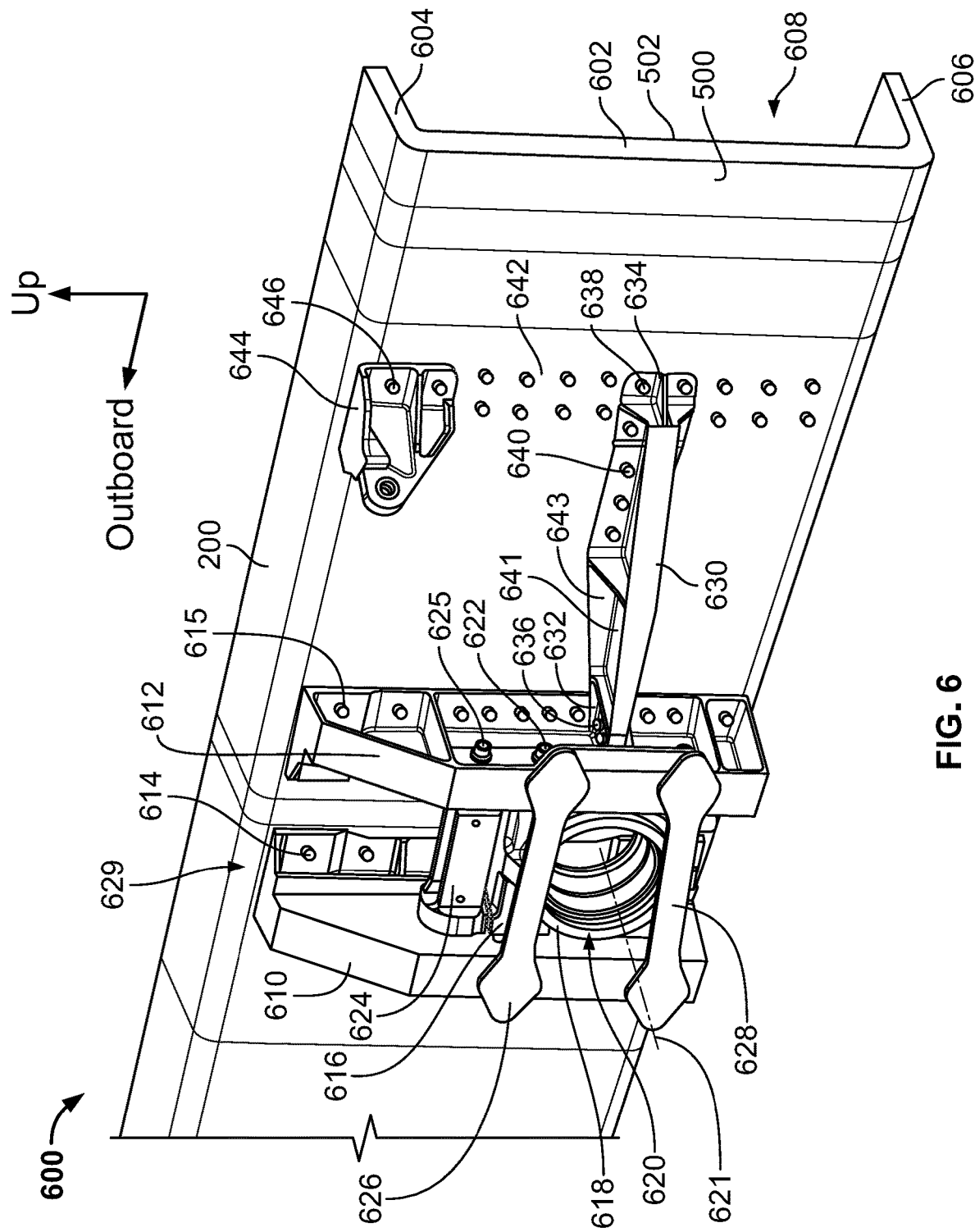
FIG. 6 illustrates an example forward trunnion support assembly and an example upper stabilization brace fitting constructed in accordance with the teachings of this disclosure.

Disclosed herein are example forward trunnion support assemblies that address the above drawbacks. FIG. 6 is a perspective view of an example forward trunnion support assembly 600 constructed in accordance with the teachings of this disclosure. The example forward trunnion support assembly 600 can be implemented on the first wing 104 of the aircraft 100 in place of the known assembly 304 shown in FIGS. 3-5. In FIG. 6, the example forward trunnion support assembly 600 is shown as coupled to the rear spar 200 of the first wing 104 (FIG. 1).

As mentioned above, the rear spar 200 has a C- or U-shaped cross-section or profile. The rear spar 200 has been cross-sectioned in FIG. 6 to illustrate the C- or U-shaped profile. The rear spar 200 includes a web 602, an upper cap 604, and a lower cap 606. The upper and lower caps 604, 606 are sometimes referred as upper and lower flanges. The upper and lower caps 604, 606 extend forward from the web 602 and define a cavity 608 facing the forward direction.

In the illustrated example, the example forward trunnion support assembly 600 includes a first vertical support fitting 610 (an outboard vertical support fitting) and a second vertical support fitting 612 (an inboard vertical support fitting). The first and second vertical support fittings 610, 612 are parallel to and spaced apart from each other. The first and second vertical support fittings 610, 612 are disposed on the rear side 500 of the rear spar 200. The first and second vertical support fittings 610, 612 are coupled to the rear spar 200 via vertical backup fittings disposed on the front side 502 of the rear spar 200, as shown in further detail in connection with FIG. 8. The first vertical support fitting 610 is coupled to a first vertical backup fitting via a plurality of fasteners 614 (e.g., bolts, screws, etc.) (one of which is referenced in FIG. 6) that extend through the rear spar 200, and the second vertical support fitting 612 is coupled to a second vertical backup fitting via a plurality of fasteners 615 (e.g., bolts, screws, etc.) (one of which is referenced in FIG. 6). Any number of the fasteners 614, 615 may be used (e.g., one fastener, two fasteners, three fasteners, etc.). In this example, the first and second vertical support fittings 610, 612 are in contact with the rear side 500 of the rear spar 200. In other examples, one or more intermediate structures (e.g., a gasket, a seal, a spacer, etc.) may be disposed between the first and/or second vertical support fittings 610, 612 and the rear spar 200.

In the illustrated example of FIG. 6, the forward trunnion support assembly 600 includes a trunnion housing 616 with a bearing 618. In this example, the bearing 618 is a spherical bearing. In other examples, other types of bearings may be implemented. The trunnion housing 616 is disposed between and coupled to the first and second vertical support fittings 610, 612. The bearing 618 forms an opening 620 that receives the trunnion 300 (FIG. 3). The bearing 618 enables the trunnion 300 to rotate/pivot. In this example, the trunnion housing 616 is oriented such that a central axis 621 of the trunnion housing 616 and the bearing 618 is perpendicular to the rear spar 200.

Figure 7:
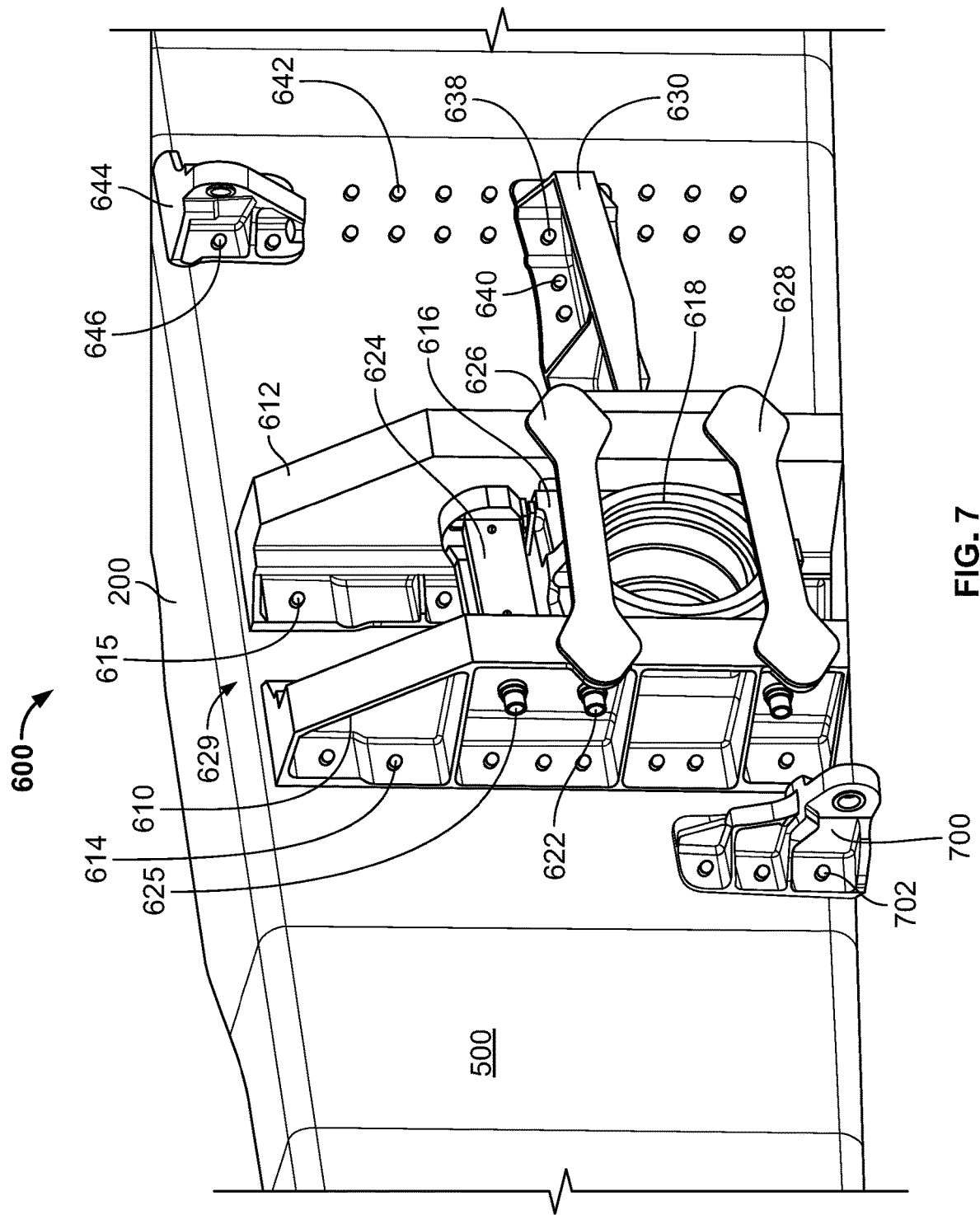
FIG. 7 is another perspective view of the example forward trunnion support assembly and the example upper stabilization brace fitting of FIG. 6 on the rear spar.

In the illustrated example, the trunnion housing 616 is coupled to the first and second vertical support fittings 610, 612 via a plurality of fuse pins 622. One of the fuse pins 622 is shown in FIG. 6. Two other fuse pins 622 are shown in FIG. 7. Any number of the fuse pins 622 may be used (e.g., one fuse pin, two fuse pins, three fuse pins, etc.). The fuse pins 622 are designed to break (shear) under a predetermined load, which enables the LMLG 204 to sever from the first wing 104 upon significant vertical loading. In other examples, other types of fasteners may be utilized.

In the illustrated example, the forward trunnion support assembly 600 includes an upper housing 624 disposed between and coupled to the first and second vertical support fittings 610, 612. The upper housing 624 is located above the trunnion housing 616. In this example, the upper housing 624 is coupled to the first and second vertical support fittings 610, 612 via a plurality of fuse pins 625. One of the fuse pins 625 is shown in FIG. 6, and another fuse pin 625 is shown in FIG. 7. Any number of the fuse pins 625 may be used (e.g., one fuse pin, two fuse pins, three fuse pins, etc.). The upper housing 624 provides additional resistance in the vertical direction should the trunnion housing 616 be forced vertically upward.

In the illustrated example, the forward trunnion support assembly 600 includes a first strap 626 (an upper strap) and a second strap 628 (a lower strap) coupled between the first and second vertical support fittings 610, 612. The first and second straps 626, 628 transfer side-to-side loads between the first and second vertical support fittings 610, 612.

The first and second vertical support fittings 610, 612, the trunnion housing 616, the upper housing 624, and the first and second straps 626, 628 form a forward trunnion housing assembly 629. In some examples, the forward trunnion housing assembly 629 is assembled first, and then forward trunnion housing assembly 629 is coupled to the rear spar 200 (e.g., via the fasteners 614, 615). In other examples, one or more of the parts of the forward trunnion housing assembly 629 may be assembled in a different order.

To distribute side loads (inboard/outboard loads) away from the trunnion housing 616, the forward trunnion support assembly 600 includes a side load fitting 630. In this example, the side load fitting 630 is located inboard relative to the forward trunnion housing assembly 629 (i.e., inboard of the first and second vertical support fittings 610, 612 and the trunnion housing 616). The side load fitting 630 has a first end 632 and a second end 634 opposite the first end 632. The first end 632 is coupled to the forward trunnion housing assembly 629 and the second end 634 is coupled to the rear spar 200. In this example, the first end 632 of the side load fitting 630 is coupled to the second vertical support fitting 612 (the inboard vertical support fitting). In some examples, the first end 632 of the side load fitting 630 is coupled to the second vertical support fitting 612 via a plurality of fasteners 636 (e.g., bolts, screws, etc.) (one of which is referenced in FIG. 6). The second end 634 of the side load fitting 630 is coupled to a side load backup fitting (shown in FIG. 8) via a plurality of fasteners 638 (e.g., bolts, screws, etc.) (one of which is referenced in FIG. 6). The fasteners 638 extend through the rear spar 200. Also, in this example, the side load fitting 630 is coupled directly to the rear spar 200 via a plurality of fasteners 640 (e.g., bolts, screws, etc.) (one of which is referenced in FIG. 6). Any number of the fasteners 636, 638, 640 may be used (e.g., one fastener, two fasteners, three fasteners, etc.). In this example, the side load fitting 630 is in contact with the rear side 500 of the rear spar 200. In other examples, one or more intermediate structures (e.g., a gasket, a seal, a spacer, etc.) may be disposed between the side load fitting 630 and the rear spar 200.

In the illustrated example, the side load fitting 630 has a first web 641 and a second web 643 (sometimes referred to as first and second flanges). In some examples, the second web 643 is perpendicular to the first web 641. In the illustrated example, the second web 643 is in contact with and coupled to the rear spar 200 via the fasteners 638, 640. The first web 641 is in contact with and coupled to the second vertical support fitting 612. An example process for coupling the first web 641 to the second vertical support fitting 612 is disclosed in further detail in connection with FIGS. 10 and 11A-11C.

If the trunnion 300 (FIG. 3) is pushed in the inboard direction, for instance, the side load fitting 630 is placed in compression and transfers the loads to the side load backup fitting and, thus, to the rear spar 200. If the trunnion 300 is pushed in the outboard direction, for instance, the first and second straps 626, 628 transfer the load from the first vertical support fitting 610 to the second vertical support fitting 612, which places the side load fitting 630 in tension. This tensile load is transferred to the side load backup fitting, which distributes the load along the rear spar 200. Thus, the side load fitting 630 is positioned to distribute side-to-side loads from the trunnion 300 (FIG. 3) and the trunnion housing 616 to the rear spar 200.

In the illustrated example, the side load fitting 630 is located closer to a center of the rear spar 200 than a top or bottom of the rear spar 200. This central area (sometimes referred to as a neutral axis) is subjected to less bending stresses than the top and bottom areas of the rear spar 200. Thus, less loads are imparted on the fasteners 636, 638, 640. As such, in some examples, smaller ones of the fasteners 636, 638, 640 can be implemented. Smaller fasteners are often lighter and less expensive. Further, the side load fitting 630 can accommodate larger side loads than known side load fittings because the fasteners 638, 640 do not need to allow for stresses from the bending of the rear spar 200. Thus, the load bearing capacity of the example forward trunnion support assembly 600 is higher than known assemblies.

The side load backup fitting (shown in FIG. 8) is coupled directly to the rear spar 200 via a plurality of fasteners 642 (e.g., bolts, screws, etc.) (one of which is referenced in FIG. 6). Any number of the fasteners 642 may be used (e.g., one fastener, two fasteners, three fasteners, etc.).

Also shown in FIG. 6 is an example upper stabilization brace fitting 644. The upper stabilization brace fitting 644 is disposed on the rear side 500 of the rear spar 200. The upper stabilization brace 306 (FIG. 3) is to be coupled to the upper stabilization brace fitting 644. The upper stabilization brace fitting 644 is coupled to the side load backup fitting (shown in FIG. 8) via a plurality of fasteners 646 (e.g., bolts, screws, etc.) (one of which is referenced in FIG. 6) extending through the rear spar 200. Any number of the fasteners 646 may be used (e.g., one fastener, two fasteners, three fasteners, etc.). The upper stabilization brace fitting 644 is disposed near a top of the rear spar 200. As shown in FIG. 6, the upper stabilization brace fitting 644 is a non-full-height stabilization brace fitting. In other words, the upper stabilization brace fitting 644 does not extend along a majority of the height of the rear spar 200 as compared to the known upper stabilization brace fitting 310 in FIGS. 3-5. As such, the upper stabilization brace fitting 644 is smaller and lighter, which reduces overall weight to the aircraft 100 (FIG. 1).

FIG. 7 is another perspective view of the rear side 500 of the rear spar 200 showing the example forward trunnion support assembly 600 and the upper stabilization brace fitting 644. The first and second vertical support fittings 610, 612, the trunnion housing 616, the bearing 618, the upper housing 624, the first and second straps 626, 628, the forward trunnion housing assembly 629, the side load fitting 630, and the upper stabilization brace fitting 644 are referenced in FIG. 7. Also, one of each of the fasteners 614, 615, 638, 640, 646 and the fuse pins 622, 625 are referenced in FIG. 7.

Also shown in FIG. 7 is an example lower stabilization brace fitting 700. The lower stabilization brace fitting 700 is coupled to the rear side 500 of the rear spar 200. The lower stabilization brace fitting 700 is coupled to the rear spar 200 via a plurality of fasteners 702 (e.g., bolts, screws, etc.) (one of which is referenced in FIG. 7). Any number of the fasteners 702 may be used (e.g., one fastener, two fasteners, three fasteners, etc.). One end of the lower stabilization brace 308 (FIG. 3) is to be coupled to the lower stabilization brace fitting 700. In this example, the lower stabilization brace fitting 700 is separate from the first and second vertical support fittings 610, 612. However, in other examples, the lower stabilization brace fitting 700 may be coupled to or integrated into the first vertical support fitting 610.

Figure 8:
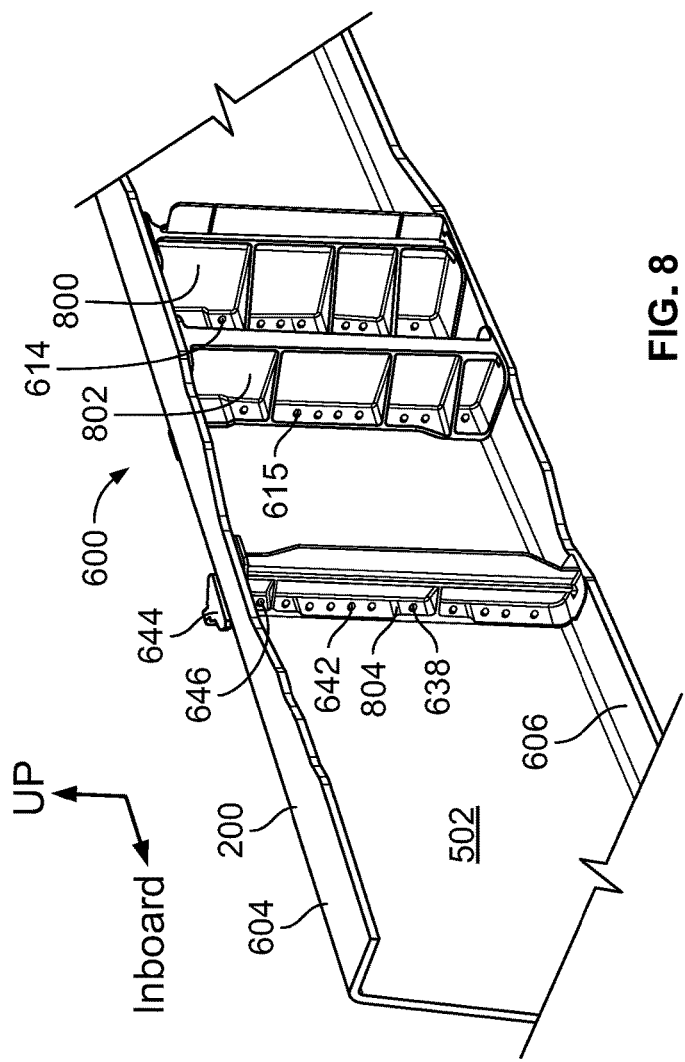
FIG. 8 is a perspective view of a front side of the rear spar of FIG. 6 showing example backup fittings used in connection with the example forward trunnion support assembly and the example upper stabilization brace fitting.

FIG. 8 is a perspective view of the front side 502 of the rear spar 200. As shown in FIG. 8, the forward trunnion support assembly 600 includes first and second vertical backup fittings 800, 802. The first vertical support fitting 610 (FIGS. 6 and 7) is coupled to the first vertical backup fitting 800 via the fasteners 614 (one of which is referenced in FIG. 8). The second vertical support fitting 612 (FIGS. 6 and 7) is coupled to the second vertical backup fitting 802 via the fasteners 615 (one of which is referenced in FIG. 8). As shown in FIG. 8, the first and second vertical backup fittings 800, 802 are full-height fittings that extend vertically between the upper and lower caps 604, 606 of the rear spar 200.

As shown in FIG. 8, the example forward trunnion support assembly 600 includes a side load backup fitting 804. The side load backup fitting 804 is disposed on the front side 502 of the rear spar 200. The side load backup fitting 804 is located inboard of the first and second vertical backup fittings 800, 802. The side load backup fitting 804 is a full height fitting that extends vertically between the upper and lower caps 604, 606 on the front side 502 of the rear spar 200. In this example, the side load backup fitting 804 is in contact with the front side 502 of the rear spar 200. In other examples, one or more intermediate structures (e.g., a gasket, a seal, a spacer, etc.) may be disposed between the side load backup fitting 804 and the rear spar 200.

As shown in FIG. 8, the side load backup fitting 804 is coupled to the rear spar 200 via the fasteners 642 (one of which is referenced in FIG. 8). As disclosed above, the side load fitting 630 (FIG. 6) is coupled to the side load backup fitting 804 via the fasteners 638 (one of which is referenced in FIG. 8), which extend through the rear spar 200. The side load fitting 630 is coupled to the side load backup fitting 804 closer to the center of the rear spar 200 than the top or bottom of the rear spar 200. The side load backup fitting 804 transfers loads to the in-plane direction along the height of the rear spar 200. Additionally, the upper stabilization brace fitting 644 is coupled to the side load backup fitting 804 via the fasteners 646 (one of which is referenced in FIG. 8), which extend through the rear spar 200. Thus, the side load backup fitting 804 provides support for both the side load fitting 630 (FIG. 6) and the upper stabilization brace fitting 644. As such, the example forward trunnion support assembly 600 results in fewer fittings required to support the various components, as in the known assembly 304 in FIGS. 3-5, which has a separate/additional backup fitting for each part. By utilizing fewer parts, the example forward trunnion support assembly 600 is lighter than known assemblies, which improves fuel efficiency for the aircraft 100 (FIG. 1).

Figure 9:
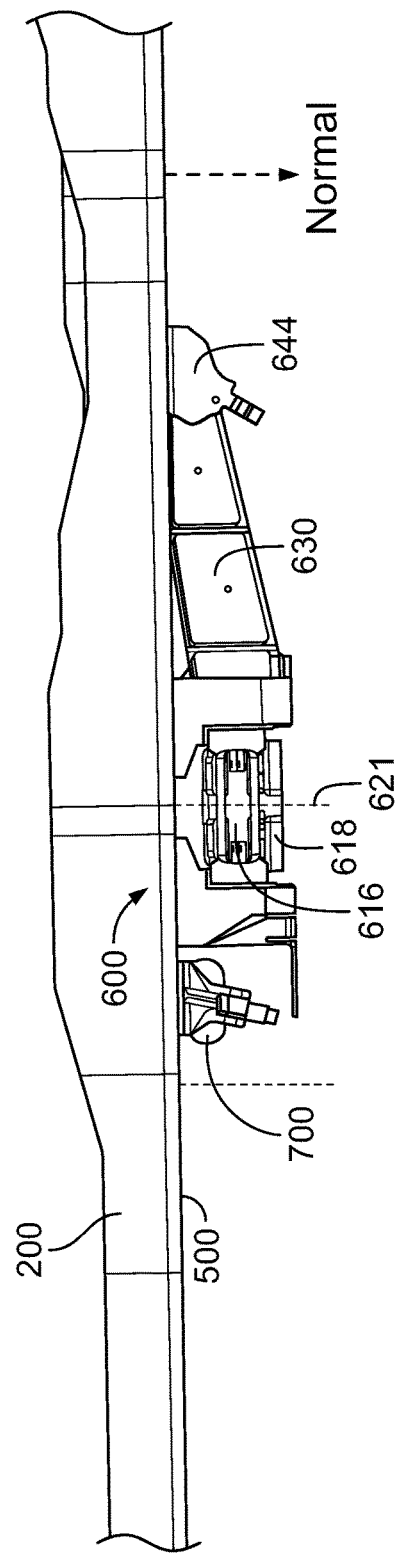
FIG. 9 is a top view of the rear spar of FIG. 6 showing the example forward trunnion support assembly and the example upper stabilization brace fitting.

FIG. 9 is a top view of the rear spar 200 showing the example forward trunnion support assembly 600 and the upper and lower stabilization brace fittings 644, 700. As shown in FIG. 9, the trunnion housing 616 is orientated parallel to the rear side 500 of rear spar 200. In particular, the central axis 621 of the trunnion housing 616 and the bearing 618 is perpendicular to the rear side 500 of the rear spar 200. Said another way, a normal of the rear spar 200 (a line extending perpendicular to the rear spar 200) and a normal of the trunnion housing 616 (a line extending perpendicular to the trunnion housing 616) are parallel. A "normal" line of the rear spar 200 is labeled in FIG. 9. The normal line for the trunnion housing 616 is coincident with the central axis 621. As shown, these two lines are parallel (in both the vertical and horizontal dimension). Because of this orientation of the trunnion housing 616, the side load fitting 630 can be employed on either side (inboard or outboard) of the trunnion housing 616 and still provide an effective load path for transferring the load to the rear spar 200, as opposed to known assemblies having trunnion housings that are angled outboard and can only effectively support side load fittings on the outboard side. This enables the side load fitting 630 to be employed on the inboard side of the trunnion housing 616 so that the side load fitting 630 can share the side load backup fitting 804 (FIG. 8) with the upper stabilization brace fitting 644. Also, because the trunnion housing 616 is parallel to the rear spar 200, the first and second vertical support fittings 610, 612 can extend outward from (e.g., perpendicular to) the rear spar 200, rather than being angled relative to the rear spar 200 as in the known assembly 304 shown in FIGS. 3-5. This eliminates hidden fasteners that are typically difficult to install. This also enables for easier maintenance inspection. Further, the parallel orientation of the example trunnion housing 616 enables use of the off-normal rotational capability of the bearing 618 more than known designs.

FIG. 10 shows an example joint formed between the first web 641 at the first end 632 of the side load fitting 630 and the second vertical support fitting 612. The fasteners 636 couple the first web 641 to a flange or web 1000 of the second vertical support fitting 612. The first web 641 and the web 1000 are parallel to each other. This interface forms a single face slip joint or shear joint. This type of joint provides a robust connection and reduces or eliminates shimming. Also, by using a side load fitting that is separate from the second vertical support fitting 612 (instead of a single integrated component), the side load fitting 630 can be easily replaced. While in this example the first web 641 is over the web 1000, in other examples, the order can be reversed. For example, the first web 641 can be disposed below the web 1000.

Figure 11A:
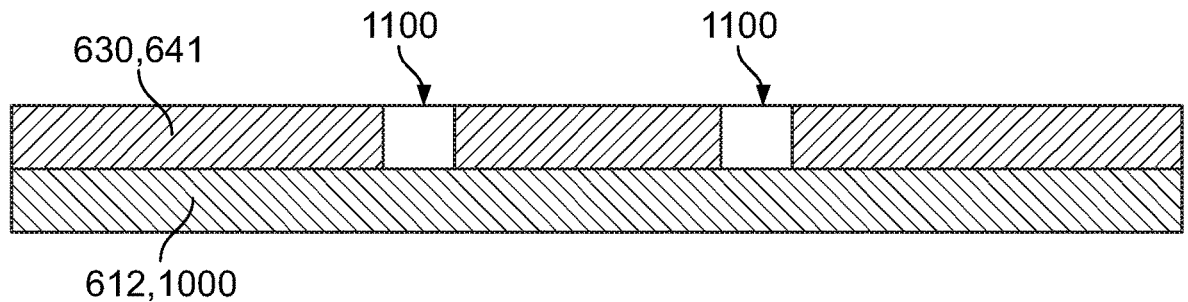
FIGS. 11A-11C show an example process of forming the joint of FIG. 10.
Figure 11B:
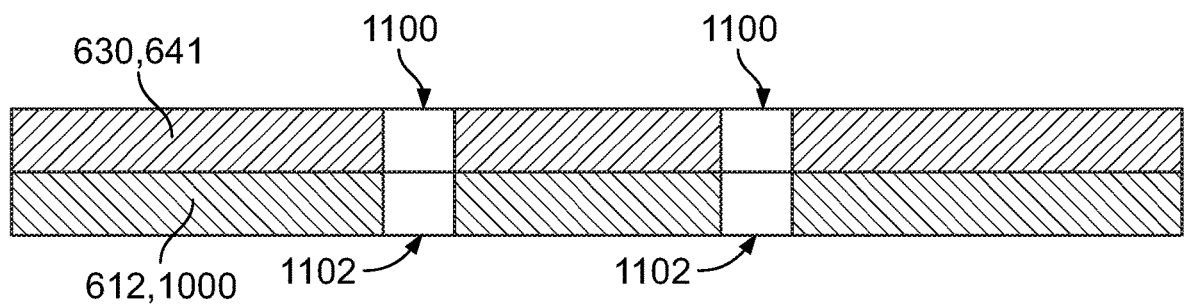
Figure 11C:
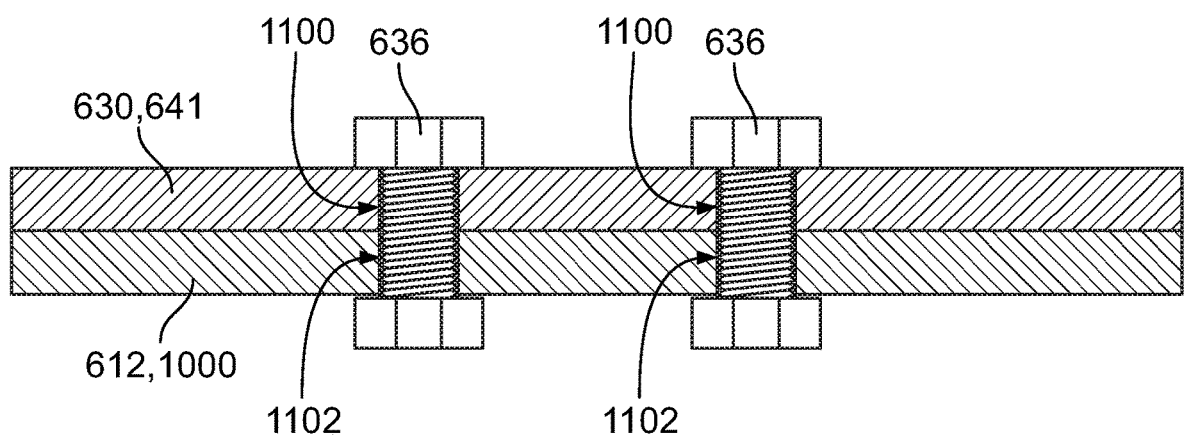

FIGS. 11A-11C illustrate an example sequence of forming the joint in FIG. 10 to couple the first web 641 of the side load fitting 630 to the web 1000 of the second vertical support fitting 612. FIGS. 11A-11C are cross-sectional views of the first web 641 of the side load fitting 630 and the web 1000 of the second vertical support fitting 612. As shown in FIG. 11A, the first web 641 of the side load fitting 630 is placed on the web 1000. In some examples, the side load fitting 630 is first coupled, via the fasteners 638, 640 (FIG. 6), to the rear spar 200 (FIG. 6) and the side load backup fitting 804 (FIG. 8). In such an example, the first web 641 is disposed on top of the web 1000. In this example, fastener openings 1100 are pre-drilled in the first web 641 of the side load fitting 630. However, fastener openings are not pre-drilled in the web 1000 of the second vertical support fitting 612. Instead, fastener openings can be drilled in the web 1000 once the first web 641 and the web 1000 are aligned.

As shown in FIG. 11B, fastener openings 1102 are drilled in the web 1000 in the same location of the fastener openings 1100 in the side load fitting 630. This ensures the fastener openings 1100, 1102 are aligned, because the fastener openings are created during installation. Drilling the fastener openings 1102 also enables more tolerance in constructing and assembling the parts. Then, as shown in FIG. 11C, the fasteners 636 are inserted through the fastener openings 1100, 1102 and tightened to couple the side load fitting 630 and the second vertical support fitting 612.

In another example, small pilot openings may be pre-drilled in the web 1000. Therefore, if there is a small mismatch between the fastener openings 1100 and the pilot openings, final fastener openings can be drilled in the correct location in the web 1000. In other examples the fastener openings 1102 may be pre-drilled in the web 1000, and the fastener openings 1100 may be drilled during installation. In another example, the fastener openings 1100 and the fastener openings 1102 may be drilled during installation.

Many example fasteners are disclosed herein for connecting the various parts of the forward trunnion support assembly 600 such as the fasteners 614, 615, 636, 638, 640, 642, 646, 702. These fasteners can be any size and/or type of fastener, including removable or reversible fasteners, such as bolts, screws, clamps, clips, etc. and/or non-reversible fasteners, such as rivets. Further, any of the example fasteners disclosed herein can be replaced by other fastening means, such as welding, adhesives, etc.

Figure 12:
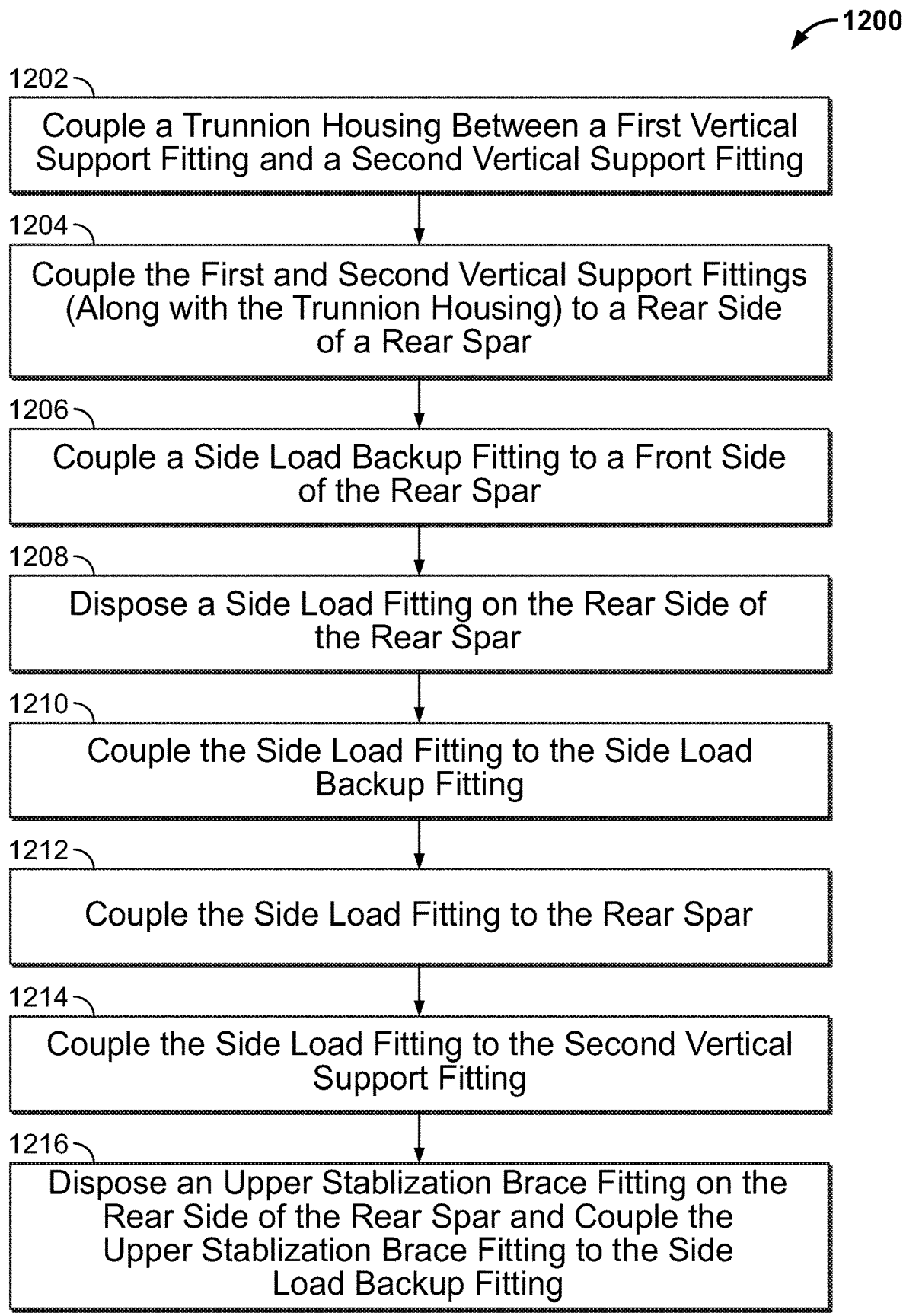
FIG. 12 is a flowchart representative of an example method of installing and/or assembling an example forward trunnion support assembly and an example upper stabilization brace fitting during a wing assembly process.

FIG. 12 is a flowchart representative of an example method 1200 of assembling and/or installing the example forward trunnion support assembly 600 and the example upper stabilization brace fitting 644 on the rear spar 200. The example method 1200 may be performed during assembly of the first wing 104 of the aircraft 100. In some examples, the wings of an aircraft are assembled first, and then the wings are coupled to the side of the fuselage. The elements of the example method 1200 may be rearranged, repeated, and/or omitted. The example method 1200 discloses the installation of parts/components on the rear spar 200. The rear spar 200 and the various parts and components may have pre-drilled openings for receiving fasteners. In other examples, one or more of the fastener openings may be drilled when installing the various parts and components on the rear spar 200.

At block 1202, the trunnion housing 616 is coupled between the first and second vertical support fittings 610, 612 (e.g., via the fuse pins 622). In some examples, the upper housing 624 and the first and second straps 626, 628 are also coupled to the first and second vertical support fittings 610, 612.

At block 1204, the first and second vertical support fittings 610, 612, along with the trunnion housing 616, are coupled to the rear side 500 of the rear spar 200. In some examples, the forward trunnion housing assembly 629 is assembled first, and then the forward trunnion housing assembly 629 is installed on the rear spar 200 as a unit. In other examples, the trunnion housing 616 can be coupled to the first and second vertical support fittings 610, 612 after the first and second vertical support fittings 610, 612 are coupled to the rear spar 200. The first and second vertical support fittings 610, 612 are coupled via the fasteners 614, 615 to the first and second vertical backup fittings 800, 802, respectively, on the front side 502 of the rear spar 200. When the forward trunnion housing assembly 629 is installed on the rear spar 200, the trunnion housing 616 is orientated parallel to the rear spar 200. As such, the central axis 621 of the bearing 618 is perpendicular to the rear spar 200.

At block 1206, the side load backup fitting 804 is coupled to the front side 502 of the rear spar 200 (e.g., via the fasteners 642). The side load backup fitting 804 is coupled to the rear spar 200 at a location that is inboard relative of the trunnion housing 616.

At block 1208, the side load fitting 630 is disposed on the rear side 500 of the rear spar 200. At block 1210, the second end 634 of the side load fitting 630 is coupled to the side load backup fitting 804. In some examples, the second end 634 of the side load fitting 630 is coupled to the side load backup fitting 804 via the fasteners 638. The fasteners 638 extend through the rear spar 200 and couple the side load fitting 630 to the side load backup fitting 804. At block 1212, the side load fitting 630 is coupled to the rear spar 200. For example, the side load fitting 630 may be coupled directly to the rear spar via the fasteners 640 (without a backup fitting). In other examples, the side load fitting 630 may not be coupled directly to the rear spar 200 without a backup fitting.

At block 1214, the first end 632 of the side load fitting 630 is coupled to the second vertical support fitting 612. In some examples, as disclosed in connection with FIGS. 11A-11C, the side load fitting 630 includes pre-drilled fastener openings 1100. Then, the fastener openings 1102 are drilled in the web 1000 of the second vertical support fitting 612 at the locations of the fastener openings 1100 in the side load fitting 630. Then, the fasteners 636 are inserted through the fastener openings 1100, 1102 and tightened. This ensures the fastener openings are always aligned, rather than trying to align pre-drilled openings. However, in other examples, the fasteners openings in both the side load fitting 630 and the second vertical support fitting 612 can be pre-drilled.

In some examples, the forward trunnion housing assembly 629 is assembled and coupled to the rear spar 200 first, and then the side load fitting 630 is coupled to the rear spar 200 and the forward trunnion housing assembly 629. This enables separate parts to be manufactured and assembled on the rear spar 200. These parts are smaller and lighter, which enables easier and quicker installation than in known designs where a large unit is assembled first and then connected to the rear spar 200.

At block 1216, the upper stabilization brace fitting 644 is disposed on the rear side 500 of the rear spar 200 and coupled to the side load backup fitting 804. In some examples, the upper stabilization brace fitting 644 is coupled to the side load backup fitting 804 via the fasteners 646, which extend through the rear spar 200. The upper stabilization brace 306 can then be coupled to the upper stabilization brace fitting 644, and the trunnion 300 can be inserted into the trunnion housing 616.

Various other parts or components can be installed and assembled to construct the first wing 104. Then, the first wing 104 may be coupled to the side of the fuselage 102. The second wing 106 may be similarly assembled and coupled to the fuselage 102.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

From the foregoing, it will be appreciated that example methods, apparatus, and articles of manufacture have been disclosed that provide lighter and less expensive forward trunnion support assemblies. By reducing weight of the aircraft, the example forward trunnion support assemblies improve fuel efficiency of the aircraft. The example forward trunnion support assemblies utilize fewer component than known assemblies and reduce footprint on the rear spar, which enables the example forward trunnion support assemblies to be implemented on smaller aircraft wings. The example forward trunnion support assemblies disclosed herein are also less expensive to manufacture and easier to install, which reduces time and labor costs associated with aircraft manufacture.

The following paragraphs provide various examples of the examples disclosed herein.

Example 1 includes an aircraft wing including a rear spar having a rear side and a front side opposite the rear side and a forward trunnion support assembly. The forward trunnion support assembly includes a first vertical support fitting and a second vertical support fitting coupled to the rear side of the rear spar and a trunnion housing with a bearing. The trunnion housing is coupled between the first and second vertical support fittings. A central axis of the bearing is perpendicular to the rear side of the rear spar. The forward trunnion support assembly also includes a side load fitting disposed on the rear side of the rear spar. A first end of the side load fitting is coupled to the second vertical support fitting, a second end of the side load fitting is coupled to the rear spar.

Example 2 includes the aircraft wing of Example 1, wherein the forward trunnion support assembly includes a side load backup fitting disposed on the front side of the rear spar. The side load fitting is coupled to the side load backup fitting via a first plurality of fasteners extending through the rear spar.

Example 3 includes the aircraft wing of Example 2, wherein the side load fitting and the side load backup fitting are located inboard relative to the trunnion housing.

Example 4 includes the aircraft wing of Example 3, further including an upper stabilization brace fitting disposed on the rear side of the rear spar. The upper stabilization brace fitting is coupled to the side load backup fitting via a second plurality of fasteners extending through the rear spar.

Example 5 includes the aircraft wing of Example 4, wherein the upper stabilization brace fitting is a non-full-height stabilization brace fitting.

Example 6 includes the aircraft wing of Example 4 or 5, wherein the upper stabilization brace fitting is located near a top of the rear spar.

Example 7 includes the aircraft wing of any of Examples 2-6, wherein the side load backup fitting extends between an upper cap and a lower cap on the front side of the rear spar.

Example 8 includes the aircraft wing of any of Examples 1-7, wherein the side load fitting is located closer to a center of the rear spar than a top or a bottom of the rear spar.

Example 9 includes the aircraft wing of any of Examples 1-8, wherein the side load fitting is coupled to the second vertical support fitting via a single face slip joint.

Example 10 includes the aircraft wing of any of Examples 1-9, wherein the rear spar is constructed of carbon fiber.

Example 11 includes a method including coupling a trunnion housing between a first vertical support fitting and a second vertical support fitting. The trunnion housing includes a bearing. The method further includes coupling the first and second vertical support fittings to a rear side of a rear spar of a wing of an aircraft. A central axis of the bearing is perpendicular to the rear spar. The method further includes coupling a first end of a side load fitting to the second vertical support fitting and coupling a second end of the side load fitting to the rear spar.

Example 12 includes the method of Example 11, wherein the side load fitting is located inboard relative to the trunnion housing.

Example 13 includes the method of Example 12, further including coupling a side load backup fitting to a front side of the rear spar.

Example 14 includes the method of Example 13, wherein coupling the second end of the side load fitting to the rear spar includes coupling the second end of the side load fitting to the side load backup fitting via a plurality of fasteners extending through the rear spar.

Example 15 includes the method of Example 13 or 14, further including disposing an upper stabilization brace fitting on the rear side of the rear spar and coupling the upper stabilization brace fitting to the side load backup fitting via a plurality of fasteners extending through the rear spar.

Example 16 includes the method of any of Examples 11-15, wherein the side load fitting includes a first web with pre-drilled fastener openings, and wherein coupling the first end of the side load fitting to the second vertical support fitting includes drilling fastener openings in a second web of the second vertical support fitting at locations of the fastener openings in the side load fitting and inserting a plurality of fasteners through the fastener openings in the first and second webs.

Example 17 includes the method of any of Examples 11-16, wherein the first and second vertical support fittings are coupled to the rear spar after the trunnion housing is coupled to the first and second vertical support fittings.

Example 18 includes an aircraft wing including a rear spar having a rear side and a front side opposite the rear side, a forward trunnion support assembly including, a side load backup fitting disposed on the front side of the rear spar, a forward trunnion housing assembly coupled to the rear side of the rear spar, and a side load fitting disposed on the rear side of the rear spar. A first end of the side load fitting is coupled to the forward trunnion housing assembly, and a second end of the side load fitting is coupled to the side load backup fitting via a first plurality of fasteners extending through the rear spar. The aircraft wing further includes an upper stabilization brace fitting disposed on the rear side of the rear spar. The upper stabilization brace fitting is coupled to the side load backup fitting via a second plurality of fasteners extending through the rear spar.

Example 19 includes the aircraft wing of Example 18, wherein the forward trunnion housing assembly including a trunnion housing with a bearing. A central axis of the bearing is perpendicular to the rear spar.

Example 20 includes the aircraft wing of Example 18 or 19, wherein the upper stabilization brace fitting is a non-full-height stabilization brace fitting.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. An aircraft wing comprising:
a rear spar having a rear side and a front side opposite the rear side; and
a forward trunnion support assembly including:

a first vertical support fitting and a second vertical support fitting coupled to the rear side of the rear spar;

a trunnion housing with a bearing, the trunnion housing coupled between the first and second vertical support fittings, a central axis of the bearing being perpendicular to the rear side of the rear spar; and a side load fitting disposed on the rear side of the rear spar, a first end of the side load fitting coupled to the second vertical support fitting, a second end of the side load fitting coupled to the rear spar, the side load fitting disposed between a top end of the second vertical support fitting and a bottom end of the second vertical support fitting.

2. The aircraft wing of claim 1, wherein the forward trunnion support assembly includes a side load backup fitting disposed on the front side of the rear spar, the side load fitting coupled to the side load backup fitting via a first plurality of fasteners extending through the rear spar.

3. The aircraft wing of claim 2, wherein the side load fitting and the side load backup fitting are located inboard relative to the trunnion housing.

4. The aircraft wing of claim 3, further including an upper stabilization brace fitting disposed on the rear side of the rear spar, the upper stabilization brace fitting coupled to the side load backup fitting via a second plurality of fasteners extending through the rear spar.

5. The aircraft wing of claim 4, wherein the upper stabilization brace fitting is a non-full-height stabilization brace fitting.

6. The aircraft wing of claim 4, wherein the upper stabilization brace fitting is located near a top of the rear spar.

7. The aircraft wing of claim 2, wherein the side load backup fitting extends between an upper cap and a lower cap on the front side of the rear spar.

8. The aircraft wing of claim 1, wherein the side load fitting is located closer to a center of the rear spar than a top or a bottom of the rear spar.

9. The aircraft wing of claim 1, wherein the side load fitting is coupled to the second vertical support fitting via a single face slip joint.

10. The aircraft wing of claim 1, wherein the rear spar is constructed of carbon fiber.

11. A method comprising:
coupling a trunnion housing between a first vertical support fitting and a second vertical support fitting, the trunnion housing including a bearing;
coupling the first and second vertical support fittings to a rear side of a rear spar of a wing of an aircraft, a central axis of the bearing being perpendicular to the rear spar;
coupling a first end of a side load fitting to the second vertical support fitting at a location between a top end of the second vertical support fitting and a bottom end of the second vertical support fitting; and
coupling a second end of the side load fitting to the rear spar.

12. The method of claim 11, wherein the side load fitting is located inboard relative to the trunnion housing.

13. The method of claim 12, further including coupling a side load backup fitting to a front side of the rear spar.

14. The method of claim 13, wherein coupling the second end of the side load fitting to the rear spar includes coupling the second end of the side load fitting to the side load backup fitting via a plurality of fasteners extending through the rear spar.

15. The method of claim 13, further including:
disposing an upper stabilization brace fitting on the rear side of the rear spar; and
coupling the upper stabilization brace fitting to the side load backup fitting via a plurality of fasteners extending through the rear spar.

16. The method of claim 11, wherein the side load fitting includes a first web with pre-drilled fastener openings, and wherein coupling the first end of the side load fitting to the second vertical support fitting includes:
drilling fastener openings in a second web of the second vertical support fitting at locations of the fastener openings in the side load fitting; and
inserting a plurality of fasteners through the fastener openings in the first and second webs.

17. The method of claim 11, wherein the first and second vertical support fittings are coupled to the rear spar after the trunnion housing is coupled to the first and second vertical support fittings.

18. An aircraft wing comprising:
a rear spar having a rear side and a front side opposite the rear side;
a forward trunnion support assembly including:
a side load backup fitting disposed on the front side of the rear spar, the side load backup fitting coupled to the rear spar via a plurality of fasteners extending through the side load backup fitting and the rear spar, the plurality of fasteners arranged in a vertical column;
a forward trunnion housing assembly coupled to the rear side of the rear spar; and
a side load fitting disposed on the rear side of the rear spar, a first end of the side load fitting coupled to the forward trunnion housing assembly, a second end of the side load fitting coupled to the side load backup fitting via a first subset of the plurality of fasteners extending through the rear spar; and
an upper stabilization brace fitting disposed on the rear side of the rear spar; the upper stabilization brace fitting coupled to the side load backup fitting via a second subset of the plurality of fasteners extending through the rear spar.

19. The aircraft wing of claim 18, wherein the forward trunnion housing assembly including a trunnion housing with a bearing, a central axis of the bearing being perpendicular to the rear spar.

20. The aircraft wing of claim 18, wherein the upper stabilization brace fitting is a non-full-height stabilization brace fitting.

* * * * *